United States Patent [19]
Frank

[11] 3,934,996
[45] Jan. 27, 1976

[54] CONVEYOR ROLLS ON CONVEYOR ROLL SYSTEMS FOR ROLL FORMING APPARATUS

[75] Inventor: Robert G. Frank, Murrysville, Pa.

[73] Assignee: PPG Industries, Inc., Pittsburgh, Pa.

[22] Filed: May 2, 1974

[21] Appl. No.: 466,342

[52] U.S. Cl. .................. 65/106; 65/104; 65/245; 65/253; 65/273; 65/286; 29/126; 29/127
[51] Int. Cl.² ........................................ C03B 23/02
[58] Field of Search ............ 65/108, 106, 101, 245, 65/253, 273, 275, 286; 29/126, 127

[56] References Cited
UNITED STATES PATENTS

| 3,485,615 | 12/1969 | Rahrig et al. .................. 65/273 X |
| 3,701,644 | 10/1972 | Frank ................................. 65/106 |

FOREIGN PATENTS OR APPLICATIONS

| 836,026 | 1938 | France .......................... 29/126 |

*Primary Examiner*—Arthur D. Kellogg
*Attorney, Agent, or Firm*—Edward I. Mates; Thomas F. Shanahan; Chester A. Johnston, Jr.

[57] ABSTRACT

In forming heat-softened sheets by the roll forming method, continuously moving sheets of heat-softenable material, such as glass sheets, are conveyed continuously along a conveyor into a roll forming station, where a pair of sets of rotating shaping rolls move relatively toward one another to provide rolling engagement against the opposite surfaces of each moving glass sheet in succession in spaced relation to the conveyor for sufficient time to shape the sheets. The sets of rotating shaping rolls then move relatively away from one another to redeposit the shaped sheet onto the conveyor. The sheets are flat entering the roll forming station and shaped to a curved configuration on leaving the roll forming station. The present invention relates to a system of conveyor rolls capable of supporting heat-softened sheets that enter the roll forming apparatus in a flat condition and that leave the roll forming apparatus in shaped condition after they have been shaped by roll forming. The conveyor roll system also comprises a plurality of conveyor rolls toward the exit end of the roll forming station having a unique flexible structure that provides positive support for the shaped sheets leaving the roll forming station.

14 Claims, 7 Drawing Figures

CONVEYOR ROLLS ON CONVEYOR ROLL SYSTEMS FOR ROLL FORMING APPARATUS

BACKGROUND OF THE INVENTION

1. Field of the Invention

The need for curved glass sheets has increased tremendously in recent years, particularly with the increase in use of curved glass for windshields, sidelights and rear windows of automobiles. The problem of increasing the rate of production of shaped glass sheets on a mass production line has been recognized and the glass shaping art developed new methods and apparatus that do not necessarily require sheets to be stopped at a shaping station as in U.S. Pat. No. 3,374,080 to Robert W. Wheeler or in U.S. Pat. No. 3,468,645 to Harold A. McMaster et al. The roll forming method developed in response to this need is disclosed in U.S. Pat. No. 3,701,644 to Robert G. Frank. The present invention relates to an improvement in the roll forming apparatus of the aforesaid patent.

U.S. Pat. No. 3,701,644 to Robert G. Frank discloses a method and apparatus for shaping sheets of heat-softenable material, such as glass sheets, with opposed sets of rotating forming rolls. The sheets of glass or other softenable material are shaped while moving between the rotating rolls. This technique for shaping glass sheets has been identified by the term "roll forming."

Usually, the glass sheets to be shaped by roll forming are conveyed as a series of heat-softened sheets along a roller conveyor in a flat state into the roll forming station. The rolls of the roller conveyor are spaced longitudinally in a common upper tangential plane that defines the path of movement of the glass sheets into the roll forming station. According to the roll forming method, each heat-softened flat glass sheet is engaged between an upper set and a lower set of rotating forming rolls of complementary shape. Each set is carried by a movable roll housing. When each glass sheet in succession reaches a position wherein its entire length is between the forming rolls, the lower set of forming rolls lifts the glass sheet to a position above the conveyor where the sets of rotating forming rolls engage the opposite surfaces of the glass sheet for sufficient time to impress the shape of the forming rolls on the glass sheet as the latter passes between the sets of rotating forming rolls. The lower set of rotating forming rolls is lowered to redeposit the shaped glass sheet on the conveyor.

The shaped sheet proceeds along the conveyor to a cooling or quenching station where the glass sheet is cooled at a rate sufficient to impart either a partial or a full temper or an anneal depending upon the rate of cooling. However, if the glass sheet is redeposited on a rigid conveyor roll of cylindrical configuration after it is shaped, the glass sheet tends to become somewhat flat before it reaches the cooling station.

In the roll forming method, it is essential that the glass be formed as closely as possible to the ultimate shape desired. The glass sheet arrives at the roll forming station in a deformable condition but is usually still essentially flat when it arrives, and leaves the roll forming station in a curved configuration. It is desired that the glass not be prematurely shaped to a wrong shape which has to be pressed out by the rotating forming rolls and it is also desired that the glass sheet after being shaped by roll forming not lose its shape while it is still hot enough to be deformed and before it is cooled at the cooling station after its passage through the roll forming station.

Flexible conveyor rolls comprising spaced stub shafts drivingly interconnected by springs that assume the shape of bent glass sheets for use in a glass shaping station are disclosed in U.S. Pat. No. 3,485,615 to Rahrig et al. and U.S. Pat. No. 3,485,618 to Ritter. In both of these patents a flexible spring is the only member secured at its opposite ends to a pair of spaced stub rolls to transmit a rotating driving force from one stub roll to the other. Whenever the bearing for the driven stub roll binds, the spring interconnecting the stub rolls develops a torsion force that causes it to develop torsional vibration. The torsional vibration causes the glass to move in a zig-zag pattern rather than along a straight line. If the glass sheet arrives at the cooling station in a skewed orientation, the blasts of cool tempering medium that chill the glass tend to distort the shape of the glass. Furthermore, when a stub shaft driven through a spring as in Ritter freezes to its bearing housing, the connecting spring winds into tighter and tighter coils until it breaks upon reaching the elastic limit. In Rahrig et al., where each stub shaft is driven independently, it is necessary to drive both stub shafts at the same peripheral speed to avoid failure of the connecting spring.

The flexible conveyor rolls of the present invention which transport the bent glass sheets out of the roll forming station are constructed to avoid these problems.

Furthermore, all the conveyor rolls at the glass shaping station of the latter two patents are flexible. Flexible rolls of the type disclosed in these patents contain many components and are more difficult to maintain in good operating condition than rigid rolls.

SUMMARY OF THE INVENTION

While it is understood that the present invention is suitable to shape deformable sheets of any composition, it will be described in terms of shaping glass sheets by the roll forming method because it is especially beneficial in shaping glass sheets to very close tolerances and with minimum optical distortions and markings.

In order to assure that the roll forming apparatus as modified by the present invention produces glass sheets whose configuration is within tolerance that is acceptable to the customer, the conveyor rolls on which heat-softened, flat glass sheets are introduced into the shaping station are essentially cylindrical and rigid, and the conveyor rolls on which the glass sheets are removed from the roll forming station after shaping are flexible and capable of conforming to the shape of the supported glass sheets. One aspect of the present invention is to combine a number of rigid conveyor rolls which are relatively easy to maintain with a minimum number of flexible conveyor rolls more suitable then rigid cylindrical conveyor rolls to transport the shaped sheets out of the sheet forming station.

Excellent conveyor rolls having a shape capable of adjustment into various shapes of curved glass sheets have been developed for use in the cooling station of a curved glass tempering apparatus. These are disclosed in U.S. patent application Ser. No. 285,998 of George R. Claassen and Rudy Canonaco, filed Sept. 5, 1972 now U.S. Pat. NO. 3,807,982 and in U.S. patent application Ser. No. 285,999 of Rudy Canonaco, filed Sept. 5, 1972. Unfortunately, the rolls developed for conveying shaped glass sheets through a cooling station, while suitable for moving shaped glass sheets through a cooling station, do not provide sufficient space for moving the lower set of forming rolls through the plane of support between positions occupied by adjacent conveyor rolls in the sheet forming station of roll forming apparatus. Accordingly, one aspect of the present invention involves improving the exit end of the sheet forming station by incorporating at said exit and flexible conveyor rolls of special construction capable of conforming to the shape of the glass.

The flexible conveyor rolls comprise a pair of spaced stub shafts interconnected through a flexible cable in such a manner that the driving force for causing one of the spaced stub shafts to rotate is transmitted mainly through the flexible cable to the other stub shaft regardless of whether the cable is straight to support flat glass or curved to conform to the curvature of shaped glass sheets. The stub shafts are externally threaded to receive the ends of a spring entrained about the cable. A fiber glass sleeve covers the spring to contact the shaped glass sheets. The latter move through the exit of the roll forming station into the cooling station by friction of the rotating flexible conveyor rolls against the supported surface of the shaped glass sheet, much in the same manner as the flat glass sheets are introduced into the sheet forming station while flat by friction of the cylindrically shaped, rigid, rotating conveyor rolls spaced along the path of movement for the sheets along an upper tangential plane common to the cylindrically shaped conveyor rolls.

The present invention will be understood better in the light of a description of an illustrative embodiment and variations thereof that follows.

BRIEF DESCRIPTION OF THE DRAWINGS

In the drawings which form part of the description of an illustrative preferred embodiment and where like reference numbers are applied to like structural elements.

DESCRIPTION OF THE PREFERRED EMBODIMENT

Figure 1:
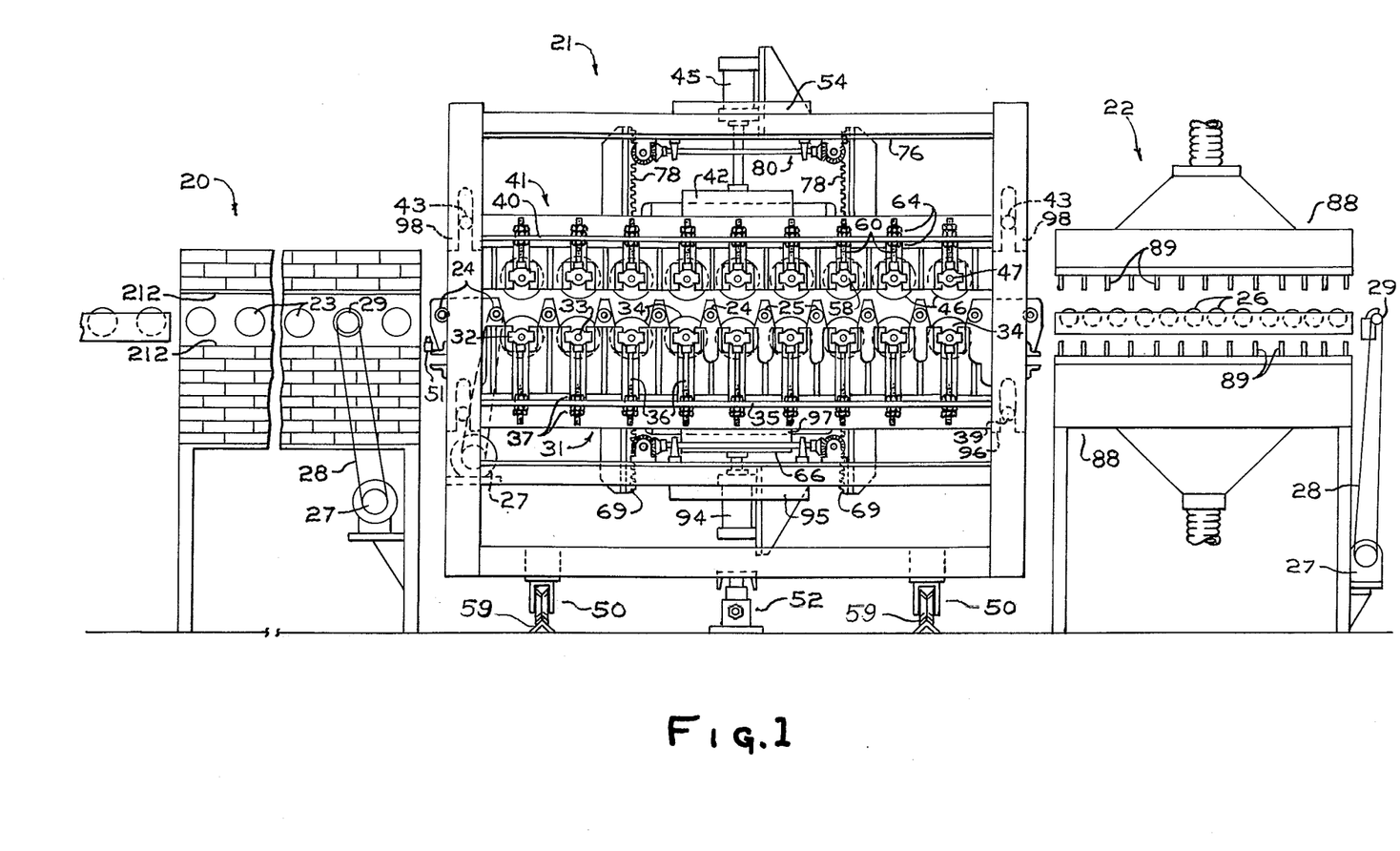
FIG. 1 is a longitudinal elevation of a portion of a preferred embodiment of apparatus incorporating a sheet forming station of the roll forming type conforming to the present invention.

Referring to the drawings, FIG. 1 discloses a side view of a roll forming apparatus of the type depicted in U.S. Pat. No. 3,701,644 to Robert G. Frank modified to incorporate a preferred embodiment of the present invention. The roll forming apparatus of the present invention comprises a tunnel-type heating furnace 20, a sheet forming station 21 of the roll-forming type, and a cooling station 22 of the type also depicted in the aforesaid Frank patent.

A glass sensing device 51 of the type well known in the art, such as an ultraviolet or infrared sensing device, is located between the exit of the furnace 20 and the entrance to the sheet forming station 21 to detect the passage of the trailing edge of a glass sheet to actuate operation of the sheet forming station 21 to perform its sheet forming function.

The conveyor system extends through the length of the furnace 20, the sheet forming station 21 and the cooling station 22. The conveyor system comprises a series of longitudinally spaced horizontally extending conveyor rolls 23 of 1¾ inch diameter disposed at three inch spacing throughout the length of the furnace for conveying a succession of glass sheets G therealong. The conveyor rolls 23 disposed in the furnace are preferably made of stainless steel and are of cylindrical configuration and rigid.

Figure 4:
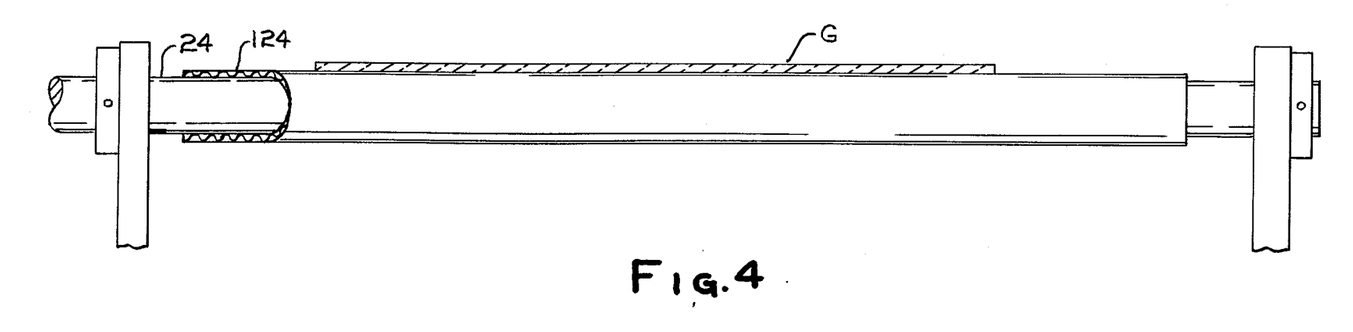
FIG. 4 is a transverse elevation view of a rigid conveyor roll of the type located in the entrance part of the roll forming apparatus.

Additional rolls 24, also of rigid stainless steel shaft construction, each having an outer diameter of 1 inch and spaced on 7 inch centers are located in the entrance end portion of the sheet forming station 21 and are covered with thin sleeves of fiber glass 124 (see FIG. 4). Additional conveyor rolls 25 which are flexible and which will be described in greater detail later are located in the exit end portion of the sheet forming station 21 and have the same outer diameters and roll to roll spacing as rolls 24. Additional conveyor rolls 26 of the type found suitable for use in the cooling station 22 and which are of the type described in either the aforesaid U.S. patent application Ser. No. 285,998 Claassen and Canonaco or Ser. No. 285,999 of Canonaco are disposed in the cooling station 22, or at least in the entrance portion of the cooling station.

Figure 2:
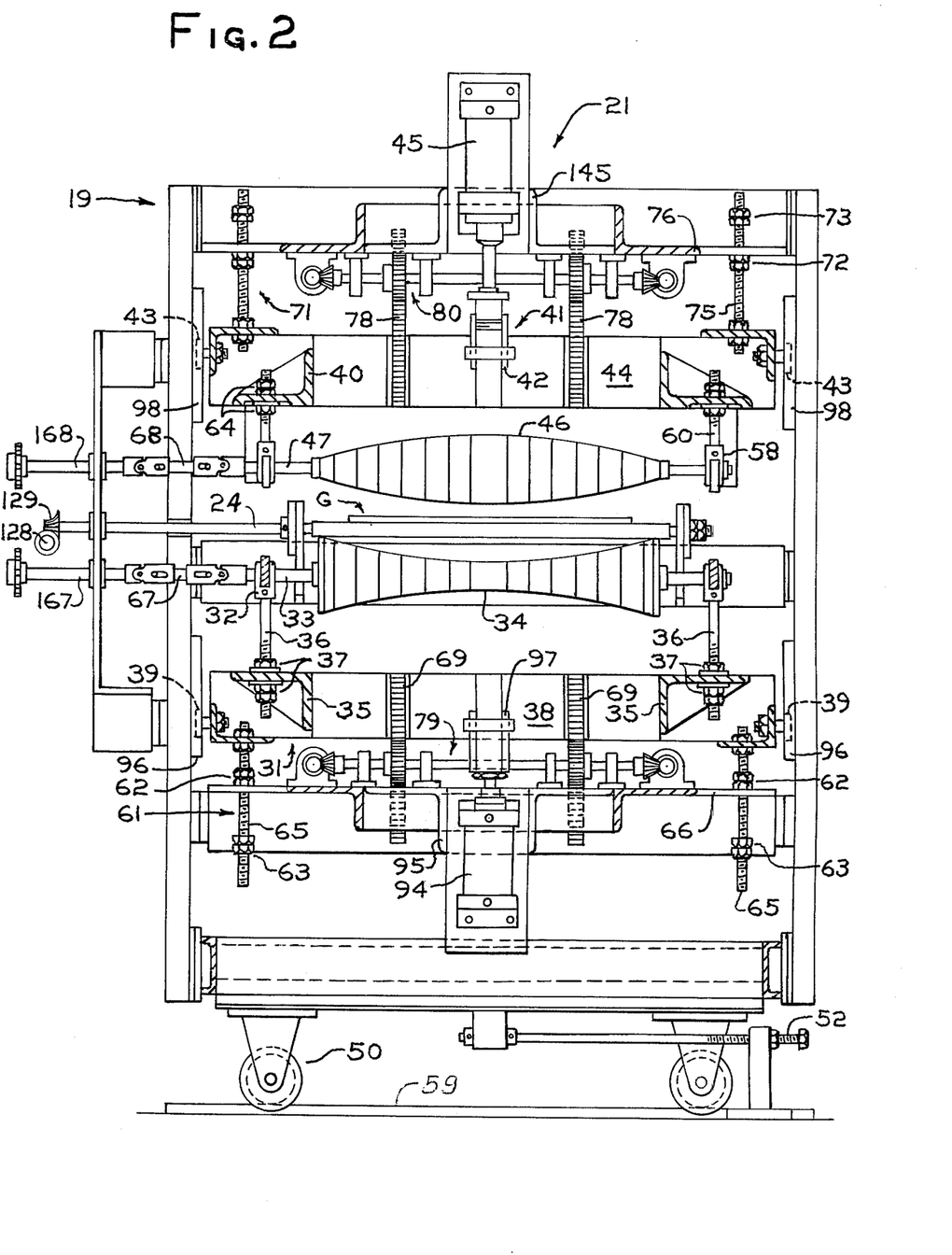
FIG. 2 is a transverse sectional view of the sheet forming station showing a pair of forming rolls in retracted position with a flat glass sheet entering the forming station for forming into a desired configuration.

The conveyor rolls 23, 24, 25 and 26 form different sections of the conveyor system. Each conveyor section is driven off a drive motor 27, a drive chain 28, a driven gear 29, and a separate longitudinally extending drive shaft 128. Bevel gears 129 are provided for each conveyor roll 23, 24, 25 and 26 to drive each roll of the section off the longitudinally extending drive shaft 128 for its respective conveyor section as shown in FIG. 2. If desired, certain conveyor rolls of one section may be disconnected by clutches from the motor driving one conveyor section for a driving connection to a motor driving another conveyor section, in a manner well known in the art. Also, the conveyor sections may be further subdivided, or the entire conveyor system may be made as one continuous section, as desired.

The furnace 20 comprises a tunnel-type passageway through which flat glass sheets are conveyed with their lower surface supported by successive rigid conveyor rolls 23. The furnace has heating elements 212 which may be electrical resistance heaters supported by the roof and the floor of the furnace so that the glass sheets may be irradiated as they are conveyed through the furnace to arrive at the furnace exit at a suitable temperature for shaping by roll forming and tempering.

The sheet forming station 21 of the present invention comprises an open reinforced frame structure 19 to which are movably supported a lower forming roll support housing 31 and an upper forming roll support housing 41. Both forming roll support housings are oriented in a horizontal plane parallel to the horizontal plane of support provided by the conveyor system. The lower forming roll support housing 31 comprises a pair of sets of vertical brackets 32. Each of the latter is located in spaced relation at 7 inch spacing along a row intersected by one of two spaced vertical planes that extend longitudinally of the conveyor system to receive one of a series of straight lower commom shafts 33 near one or the other of its ends. The brackets 32 of each pair of brackets that support one of the lower common shafts 33 are located in a common vertical plane that extends normal to the first two vertical planes and parallel to the common vertical planes in which other pairs of brackets that support the other straight lower common shafts are located.

The brackets 32 are adjustably positioned to support the series of common shafts 33 either in alignment with one another either in a horizontal line in a plane parallel to the plane of support provided by the upper tangent common to the horizontal conveyor rolls 23, 24, 25 and 26 of the conveyor system or in an oblique line or in adjustment along a curved line defined by the position of each bracket 32 along each of the two longitudinally extending, spaced, vertical planes or any combination of horizontal, oblique or curved lines as dictated by the nature of the shape to be imparted to the glass sheets being shaped.

Each of the lower common shafts 33 rotatably supports one of a series of lower segmented forming rolls 34. Each segment of the segmented forming rolls 34 is approximately 2 inches long axially, except for the centermost segments which are approximately 4 inches long. Each central shaping segment is flanked by an equal number of flanking shaping segments on either side thereof.

An apertured longitudinally extending horizontal angle member 35 is supported along each side of the lower forming roll support housing 31. Each aperture of each horizontal angle member 35 is vertically aligned below an internally threaded member extending downwardly from a corresponding one of the brackets 32. A series of threaded shafts 36 have their upper ends connected to the brackets 32 and their lower ends extending through a corresponding aperture of one or the other of the horizontal angle members 35. Suitable lock nuts 37 are provided along each shaft 36 above and below a corresponding member 35 to adjust the axial position of the threaded shafts 36 relative to the horizontal angle member 35 so as to fix the position of each bracket 32 relative to the lower roll housing support structure 31. Each horizontal member 35 interconnects a pair of lower end plates 38. A roller 39 is attached to each end of each lower end plate 38.

The vertical position of each bracket 32, as determined by adjustment of its associated threaded shaft 36, controls the position of an end portion of a lower common shaft 33. The adjusted position of each pair of brackets 32 of each lower common shaft 33 establishes the orientation of the segmented forming rolls 34 that are mounted on the shafts 33. Each shaft 33 is straight to facilitate mounting and replacement of the segments of a forming roll of desired configuration thereon. It is thus a simple matter to remove one set of forming rolls conforming to one configuration and replace its segments with another set of forming rolls whose segments conform to another configuration whenever parts of a different configuration are to be produced The lower forming roll support housing 31 is rigidly attached to a lower vertical piston 94 mounted on a piston support structure 95 attached to the open reinforced frame structure 19. A pair of lower vertical slotted plates 96 is carried by the frame structure 19 for receiving the rollers 39 attached to each end plate 38 of the lower forming roll support housing 31. A cross-beam 97 is attached to the upper end of piston 94 and interconnects the end plates 38 which are also interconnected by the lower apertured angle members 35. This provides a rigid structure for the lower forming roll support housing 31 so that the set of lower forming rolls 34 supported by said lower forming roll support housing 31 moves in unison in response to actuation by the piston 94.

The open reinforced frame structure 19 also carries two pairs of upper vertically slotted plates 98 that receive upper guide rollers 43 fixed to the ends of upper end plates 44. The latter interconnect the opposite ends of a pair of upper, apertured, longitudinally extending, horizontal angle members 40 that form part of an upper forming roll support housing 41, and that have a reversed structure of those of the horizontal members 35. The upper end plates 44 are connected to an upper cross-beam 42 which is fixed to the free lower end of an upper piston 45, which is extendable in a downward direction. A cylinder for the upper piston is supported on an upper piston support structure 145 forming part of the reinforced frame structure 19.

In vertical planes intermediate the vertical planes occupied by the conveyor rolls 24 and 25 and in alignment with the vertical planes occupied by the lower set of segmented forming rolls 34, the upper forming roll support housing 41 supports a set of upper segmented forming rolls 46. Each upper segmented forming roll comprises a plurality of segments mounted on a straight upper common shaft 47. The shape of each segment of each upper forming roll 46 is complementary to the shape of the corresponding segment of its corresponding lower forming roll 34.

The vertical position of each of the upper segmented forming rolls 46 is adjustable in the manner similar to the adjustment provided for the lower segmented forming rolls 34. For example, each upper shaft 47 is received rotatably in one of a series of upper shaft brackets 58, each of which is a reversal of a bracket 32. The lower ends of externally threaded rods 60 are connected to internally threaded upper end portions of brackets 58 and their upper ends extend through apertures in one or the other of the upper, apertured, longitudinally extending, horizontal angle members 40 and are fixed in position to the latter through pairs of adjustment nuts 64 for each threaded rod, one nut being below the angle member 40 and at least one nut mounted above the angle member 40 to determine the vertical position of each upper bracket 58 that determines the vertical position of each end portion of each upper common shaft 47.

As seen in FIG. 2, the segments of the lower segmented forming rolls 34 form a substantially continuous concave contour in the axial direction of the straight common shafts 33. This shape conforms to the shape desired about an axis parallel to the path the glass sheet takes through the sheet forming station 21 for an incremental portion of each glass sheet shaped by roll forming. The segments of the upper segmented forming rolls 46 have generally convex outer configurations that are complementary to the configurations of the lower forming roll segments they oppose.

Hence, if all the upper segmented rolls 46 have their shafts 47 in alignment in an upper horizontal plane and the lower segmented rolls 34 have their shafts aligned in a lower horizontal plane, when piston 94 is extended upwardly, the segmented rolls 34 are lifted in unison to positions above the horizontal plane occupied by the tangent common to the upper portion of the circumferences of the conveyor rolls 24 and 25 in the sheet forming station. Each vertically aligned pair of rotating upper and lower forming rolls engage different increments of a heat-softened glass sheet moving through a roll-forming station when the piston 94 is extended upward a sufficient distance to lift the lower segmented forming rolls 34 into positions of rolling engagement against the undersurface of the glass sheet and forcing the upper surface of the glass sheet into rolling engagement against the upper set of forming rolls 46. Thus, the rotating rolls impose bending forces on different longitudinal increments of the traveling glass sheet simultaneously.

The composition of the roll segments is very important to insure proper operation of the roll forming apparatus with minimum glass breakage or glass marking. The material must have a low thermal conductivity to minimize thermal shock on the hot glass when the latter engages the relatively cold shaping rolls. The rolls must have a low coefficient of thermal expansion over a wide range of temperatures of approximately 600°F. from room temperature to an elevated temperature that the forming rolls attain on periodically contacting hot glass. They must be of a composition that does not react chemically with glass, that is durable over said wide temperature range, and is readily shaped or machined to complex contours. To meet the aforesaid requirements, the segments of the forming rolls 34 and 46 are composed of an asbestos cement of aluminosilica composition sold by Johns Manville under the trademark of TRANSITE.

In order to minimize marking of the glass surface due to rubbing by portions of the shaping rolls whose peripheral velocity differs sufficiently from the speed of the glass sheet moving through the roll forming apparatus to cause observable rubbing marks, only selected segments of the segmented forming rolls 34 are keyed to the lower shaft 33 to rotate therewith and the remaining segments of the lower forming roll are freely rotatable relative to the lower shafts. Likewise, only selected segments of the upper segmented forming rolls 46 are keyed to the upper shafts 47, while the remaining segments are freely rotatably thereon. In addition, low friction devices are disposed between adjacent segments to minimize friction between adjacent segments.

Suitable driving means are provided to rotate the keyed segments of forming rolls 34 and 46 at optimum peripheral speed. The lower shafts 33, which rotatably support the forming rolls 34, are connected to a common drive shaft through flexible coupling means 67. The upper shafts 47, which rotatably support the segments of the upper forming rolls 46, are connected to their respective drive shafts through flexible coupling means 68. The upper drive shafts are connected through suitable spur gearing to a drive motor independent of the drive motor for the drive shaft for the lower shafts 33 for reasons that are explained in a copending application Ser. No. 466,343 of Robert G. Frank, filed on the same date as this application.

The entire open frame structure 19 is mounted on transverse guides 59 for transverse alignment by adjustment means 52. It also facilitates removal of one forming station and its replacement by another forming station adjusted to produce glass sheets of a different pattern with minimum interruption to continuous operation.

In order to assure proper alignment between the upper roll support housing 41 and the lower roll support housing 31 when there is relative movement between the housings 31 and 41 or between each housing and the frame structure 19, each housing is provided with an alignment mechanism. The alignment mechanism for the lower roll housing 31 comprises four lower racks 69 extending downward from housing 31 to mesh with certain gears of a lower rectangular array 79 of lower horizontal connecting rods and gears connected to a lower platform 66 forming part of the frame structure 19. A similar arrangement of upper racks 78 extends upward from the upper roll support housing 41 to mesh with certain gears of an upper rectangular array 80 of rods and gears affixed to an upper platform 76 forming part of the frame structure 19 to align the upper roll housing 41.

The lower forming roll support housing 31 is provided with lower stop members 61 and the upper forming roll support housing 41 is provided with upper stop members 71. Each of the lower stop members 61 comprises a lower limit adjustment means 62 and an upper limit adjustment means 63 in the form of lock nuts adjustably mounted on one of a plurality of lower threaded shafts 65. Each of the latter is rigidly secured at its upper end to the lower forming roll support housing 31 and extends through an aperture in the lower platform 66 of the open reinforced frame structure 19 with lower limit adjustment means 62 disposed above the lower platform 66 and the upper limit adjustment means 63 disposed below the lower platform 66.

Each of the upper stop members 71 comprises an upper limit adjustment means 72 and a lower limit adjustment means 73 in the form of lock nuts adjustably mounted on one of a plurality of upper threaded shafts 75. The latter is rigidly secured at its lower end to the upper forming roll support housing 41 and extends through an aperture in an upper platform 76 of the open reinforced frame structure 19 with upper limit adjustment means 72 disposed below the upper platform 76 and the lower limit adjustment means 73 disposed above the upper platform 76.

The lower limit adjustment means 73 of the upper forming roll support housing 41 and the upper limit adjustment means 63 of the lower forming roll support housing 31 are adjusted according to the thickness of glass sheets undergoing roll forming so that the minimum spacing between corresponding shaping rolls in the direction of the glass sheet thickness exceeds the glass sheet thickness by a predetermined amount based on the tolerance permitted by the customer. This is usually between 0.01 inch and 0.05 inch, preferably 0.02 inch to 0.04 inch.

Figure 3:
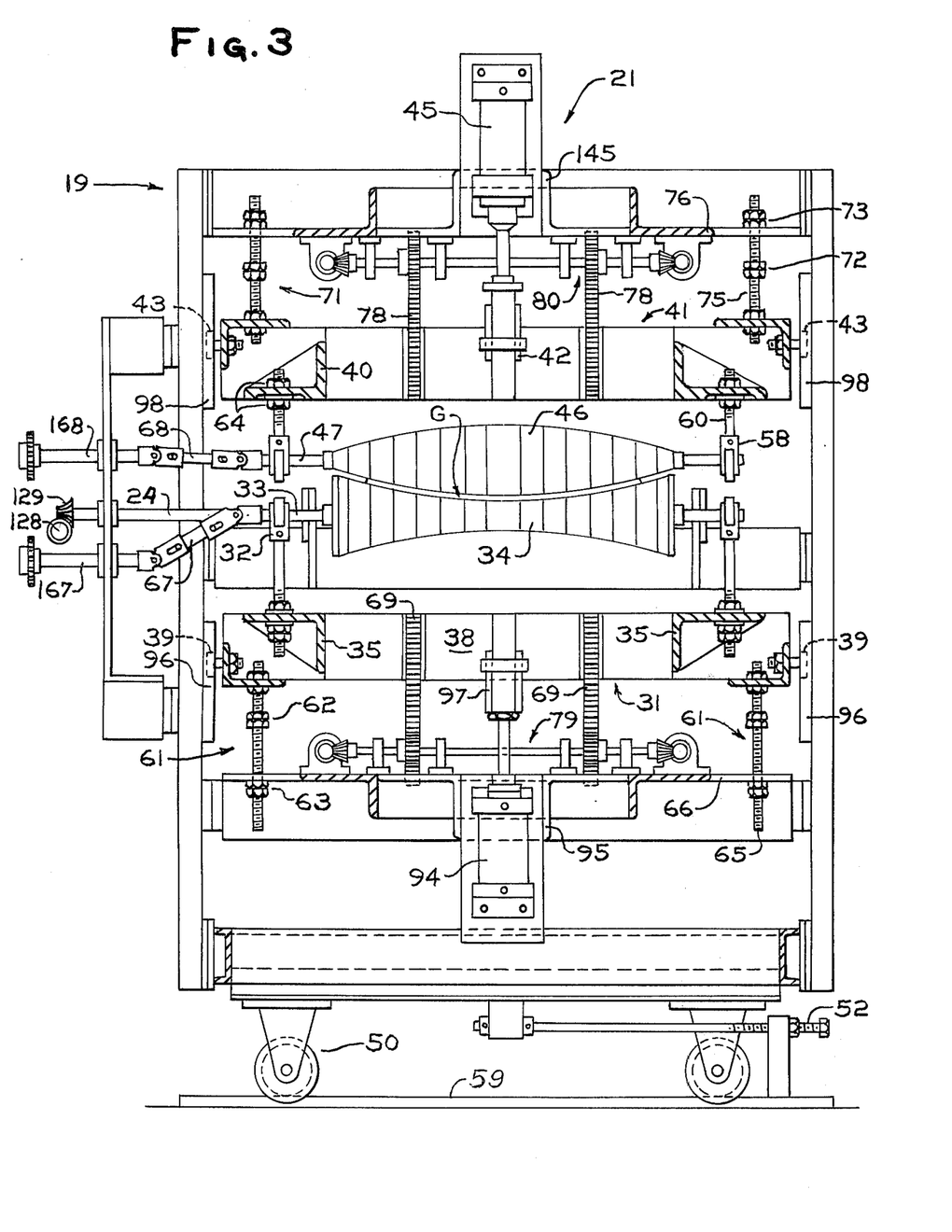
FIG. 3 is a view similar to FIG. 2 showing how the forming rolls of FIG. 2 engage a glass sheet during the process of roll forming.

FIGS. 2 and 3 show the roll forming apparatus in the respective positions occupied when the rotating forming rolls 34 and 46 are retracted from one another when a flat glass sheet is entering the roll forming station 21 (FIG. 2), and in the position occupied when they are engaging a glass sheet G that is being shaped (FIG. 3). While it is possible to operate the roll forming apparatus so that only the lower set of segmented forming rolls 34 are moved vertically toward and away from the corresponding upper set of segmented forming rolls 46 to shape the glass sheets, greater flexibility is provided when both the upper forming rolls 46 and the lower forming rolls 34 are provided with vertical movement. However, it is necessary that the lower forming rolls 34 retract in the flat glass receiving position to a position below the horizontal plane occupied by the common tangent to the upper surfaces of all of the conveyor rolls 34 and 25 in the sheet forming station 21, as depicted in FIG. 2, and that the lower forming rolls 34 occupy an upper position wherein the entire upper surfaces of the forming rolls 34 is above the common plane of the conveyor rolls 24 and 25, as depicted in FIG. 3.

With reference to FIG. 4, the conveyor rolls at the entrance end of the sheet forming station 21 comprise a solid, rigid roll 24 covered with a fiber glass covering 124. These rolls are of cylindrical configuration and have a common upper tangent that forms a continuation of the plane of support provided by the common upper tangent of conveyor rolls 23 in the furnace 20.

Figure 5:
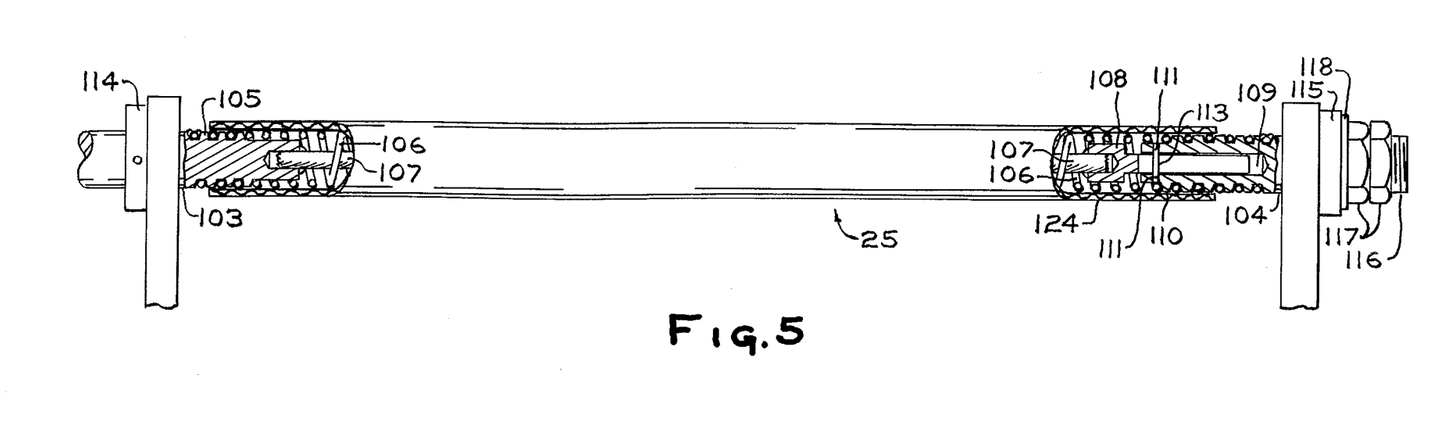
FIG. 5 is a view similar to that of FIG. 4 with parts broken away to show a flexible conveyor roll used in the exit portion of the sheet forming station where the conveyor roll is adjusted to assume a straight sheet supporting surface in the unloaded position.
Figure 6:
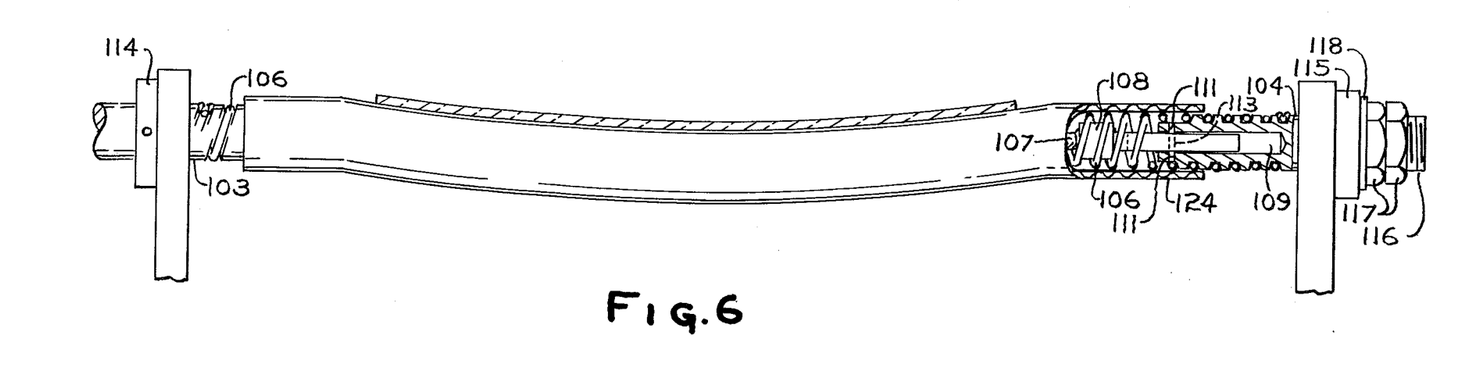
FIG. 6 is a view similar to FIG. 5 showing how the shape of the rotating flexible conveyor roll is modified while supporting a curved glass sheet after the latter has been shaped at the sheet forming station and deposited thereon.

The exit end portion of the sheet forming station 21 comprises a series of flexible rolls 25 whose flexible structure enables each roll to assume the shape of the glass sheets when the lower segmented shaping rolls 34 are retracted to a position below the positions occupied by the conveyor rolls 24 and 25. When unloaded, flexible conveyor rolls 25 occupy positions where their common upper tangent forms a continuation of the common upper tangent of the rigid conveyor rolls 24.

Figure 7:
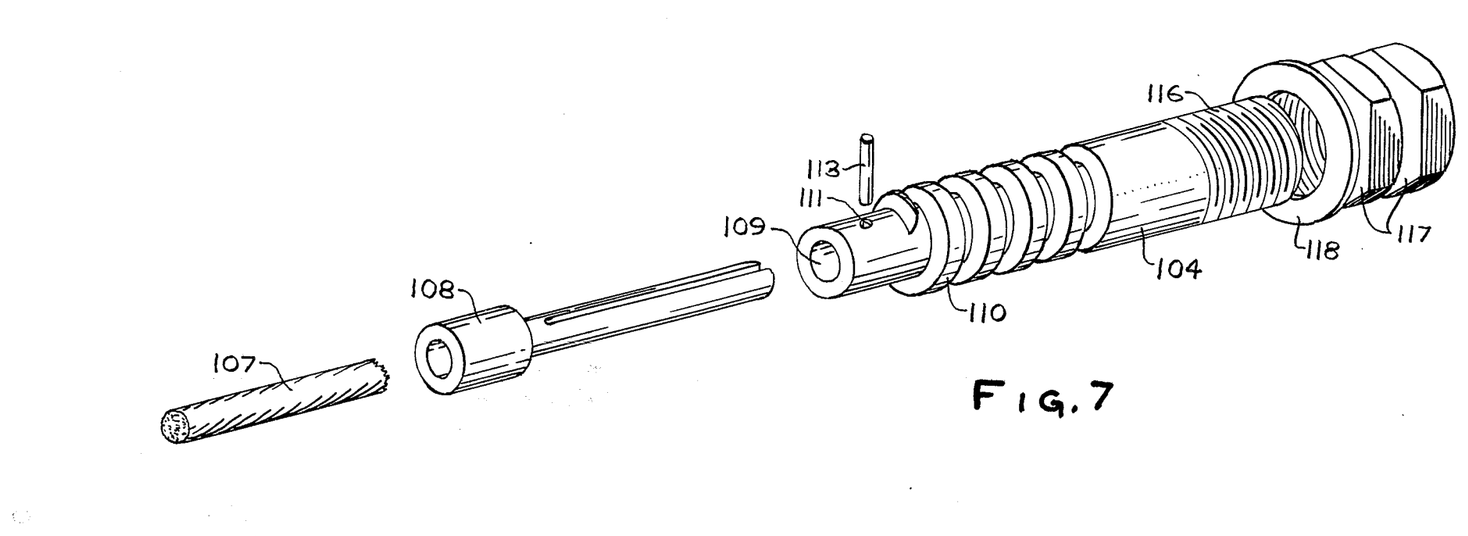
FIG. 7 is an exploded view in perspective of certain structural elements of the flexible conveyor roll of FIGS. 5 and 6.

Each flexible conveyor roll 25 comprises a pair of stub shafts 103 and 104 respectively. Stub shaft 103 is grooved helically at 105 along its outer surface at a pitch equal to the pitch of a spring 106 to receive the last few turns of the spring 106. A flexible steel cable 107 formed of twisted steel strands is attached at one end by brazing to an inner recess of an inner portion of reduced diameter of stub shaft 103. A slotted member 108, such as a clothespin type member having an inner head portion and an outer slotted portion of reduced diameter, is rigidly attached to the other end of the flexible cable 107 by brazing the latter end to a recess in the inner head portion of the member 108. The slotted outer end of the clothespin type member 108 is reduced in diameter and is slidably received within a cylindrical recess 109 of the laterally inner portion of stub shaft 104.

The latter has an externally helically grooved portion 110 like the helically grooved portion 105 of stub shaft 103. The helically grooved portions 105 and 110 have the same pitch and their depth equals the thickness of the coils of the spring 106 so that grooved portion 110 receives the last few turns of the other end of the spring 106 from that engaged in the grooved portion 105.

The slot in the slotted end of the slotted member 108 is oriented to be in alignment with a pair of diametrically aligned apertures 111 formed in the cylindrical recess 109 of the stub shaft 104. A drive pin 113 extends through the apertures 111 and the slot at the slotted end of the slotted member 108. The opposite ends of the spring 106 are brazed to the stub shafts 103 and 104 and the first few turns at either end are received in the helical grooves of the grooved inner portions 105 and 110 of the respective stub shafts 103 and 104.

A fiber glass sleeve 124 is mounted over the length of each flexible roll 25 including a portion of the stub shafts 103 and 104. The outer diameter of the spring 106 is equal to the diameter of the grooved portions 105 and 110 of the respective stub shafts 103 and 104 and the sleeve 124 fits directly over the stub shafts 103 and 104 and the spring 106 extending intermediate the stub shafts.

In an illustrative embodiment of the invention, the stub shafts 103 and 104 have outer diameters of 1 inch, the cable 107 has a diameter of one-half inch. The spring having an inner diameter of 0.655 inch and an outer diameter of 1 inch is formed of coiled wire about 0.17 inch thick helically wound to a pitch of four coils per inch of length and the fiber glass sleeve 124 is about 0.025 inch thick.

The flexible cable 107 extends within the spring 106. Practically all of the power transmitted to stub shaft 103 to cause the latter to rotate is directly communicated to stub shaft 104 through the cable 107 via drive pin 113 and slotted member 108, and very little of the power, if any, is transmitted through the spring 106. As a result, very little torsion is imparted to the spring so that there is virtually no torsional vibration imparted to the spring as power is delivered to rotate the stub shafts in unison.

When the conveyor roll becomes hot through intermittent contact with hot glass sheets so that the cable and the spring tend to become extended, the cable is free to move relative to the stub shaft 104 a distance equal to the length of the slot in the slotted end of the clothespin type member 108 and still remains in driving relation with the stub shaft 104.

Bearing housings 114 and 115 are provided for the respective stub shafts 103 and 104. Axially outward of the bearing housing 115, stub shaft 104 is externally threaded at 116 to receive a pair of lock nuts 117 and a washer 118 to adjust the axial position of stub shaft 104, which fixes the tension on spring 106. Cable 107 is capable of loosening or tightening in response to the tension applied to spring 106 since the position of the slotted end of the clothespin member 108 within slot 109 is readily adjusted. The lock nuts 117 are adjusted to tension the spring 106 barely sufficiently to cause the spring 106 and the cable 107 extending therethrough to extend in a horizontal line from stub shaft 103 to stub shaft 104 with no load thereon.

The cooling station 22 may be of any type of glass tempering or heat-strengthening apparatus that is well known in the art. One type of cooling station that may be used is disclosed in U.S. Pat. No. 3,245,772 to James H. Cypher and Charles R. Davidson, Jr. Preferably, it comprises upper and lower nozzle boxes 88, each having a set of longitudinally spaced, elongated slot nozzle openings 89 extending transversely of the path defined by the portion of the conveyor system that extends through cooling station 22 that includes flexible conveyor rolls 26. The slot openings are preferably about three-sixteenth inch to one-fourth inch wide and about 3 inches apart in each set and the nozzle openings of one set are about 5 inches from the nozzle openings of the other set, and aligned in vertical plane that intersect the spaces between adjacent conveyor rolls 26. The latter have an outer diameter of 2 inches or less at their axial ends and decrease in diameter toward their central portion as needed to conform to the shape of glass sheets being conveyed through the cooling station 22. The exact structure of the cooling station forms no part of the present invention and this description thereof is made as brief as possible because any cooling station used to temper glass sheets on a roller hearth may be used in conjunction with the present invention. Pressurized air from blowers (not shown) is supplied to the upper and lower nozzle boxes 88 for discharge through the nozzle openings 89 to cool bent glass sheets as they are conveyed through the cooling station 22.

If desired, exit doors of the type well known in the art may be included to intermittently close the exit slot openings of the furnace 20 and a similar door at the entrance of the cooling station 22 may be included to intermittently close the opening to the cooling station 22. This minimizes the exposure of the sheet forming station to the hot atmosphere of the furnace 20 at one end and to the cold blasts of the cooling station 22 at the other end.

The present invention provides a series of rigid conveyor rolls 24 of cylindrical configuration at the entrance portion of the sheet forming station 21 to provide rolling support for heat-softened flat glass sheets entering the sheet forming station 21 and flexible conveyor rolls 25 that conform to the shape of the bent glass sheets at the exit portion of the sheet forming station to provide a positive support and positive driving force to transfer the bent glass sheets to the cooling station 22. The flexible conveyor rolls 25 are specially constructed to have a flexible cable 107 rigidly connected to one stub shaft 103 at one end and rigidly connected at its other end to a slotted member (such as clothespin type member 108) that is slidably received for axial movement within a cylindrical recess 109 at the axially inner end of another stub shaft 104.

The aligned apertures 111 and the drive pin 113 cooperate with the slotted portion of the slotted member 108 to provide means to drivingly connect the other end of cable 107 with stub shaft 104 while permitting axial movement therebetween. Thus, the cable 107 is constructed and arranged to provide a major portion of the driving connection between stub shafts 103 and 104. The spring 106, through which the cable 107 extends, is positively supported at its ends in the helical grooved portions 105 and 110 of the stub shafts 103 and 104 and is free to conform between said stub shafts to the shape of the sheets conveyed thereon in transit to the cooling station 22. The cable 107 is free to follow the change in shape of the spring 106 because the movable end of the cable 107 pulls the slotted member 108 within the cylindrical recess 109 without interrupting the driving engagement between the drive pin 113 and the elongated slot of the slotted member 108.

The thickness of the cable 107 is about three times the thickness of the spring 106 and the driving connection between the pin 113 and the slotted end of slotted member 108 permits virtually no rotative movement between the cable 107 and the stub shaft 104. Hence, the rotational force from one stub shaft is transmitted to the other stub shaft mainly through the relatively thick cable and only an insignificant portion thereof, if any at all, is provided through the spring 106. The tension applied to the spring 106 by adjusting the position of stub shaft 104 is barely sufficient to prevent it from sagging when the flexible roll 25 is not supporting any mass.

The form of the invention shown and described herein represents an illustrative preferred embodiment thereof and it is understood that various changes may be made without departing from the gist of the invention as defined in the claimed subject matter that follows.

I claim:

1. A method of shaping sheets comprising conveying a heat-softened sheet into a sheet forming station comprising upper and lower sets of rotatable forming rolls having complementary curvatures while supported on a plurality of rotating rigid conveyor rolls of cylindrical configuration having a common upper tangent defining a support plane, rotating said rotatable forming rolls, lifting said softened sheet on a plurality of said lower set of said rotating shaped forming rolls until the opposite surfaces of said deformable sheets are engaged and fed longitudinally between said upper and lower sets of rotating forming rolls for sufficient time to shape said sheet to conform to said complementary curvatures, lowering said shaped sheet on said lower set of rotating forming rolls near the downstream end thereof to transfer said shaped sheet onto a series of flexible rotating conveyor rolls capable of self-conforming to the shape of the formed sheets and removing the shaped sheets while supported on said flexible conveyor rolls.

2. Apparatus for shaping heat-softened sheets comprising a sheet forming station and a conveyor comprised of a plurality of conveyor rolls longitudinally spaced throughout the length of said sheet forming station, said sheet forming station comprising an upper and a lower set of shaped forming rolls, said shaped forming rolls including pairs of corresponding upper and lower forming rolls of complementary curvature disposed between adjacent of said conveyor rolls, said conveyor including a plurality of rigid conveyor rolls of cylindrical configuration extending into the entrance end portion of said sheet forming station and a plurality of flexible conveyor rolls extending from within said sheet forming station to the exit end portion of said sheet forming station, said flexible rolls being constructed and arranged to self-conform to the shape of a formed sheet for conveying the latter out of said sheet forming station, means for moving said lower set of forming rolls between a retracted position below said conveyor rolls and a sheet engaging position above said conveyor rolls and means for rotating said conveyor rolls.

3. Apparatus as in claim 2, wherein said flexible conveyor rolls comprise a pair of spaced, axially aligned stub shafts, a flexible cable extending between said spaced stub shafts, means rigidly connecting one end of said cable to one of said stub shafts, means connecting the other end of said flexible cable to the other of said stub shafts in axially adjustable position relative to said other stub shaft, means preventing relative rotation of said other end of said flexible cable relative to said other stub shaft to transmit a driving force resulting from rotating said one stub shaft through said flexible cable to said other stub shaft.

4. Apparatus as in claim 3, further including a spring extending from said one stub shaft to said other stub shaft in surrounding relation to said flexible cable, each of said stub shafts haivng a helical groove to receive the opposite ends of said spring, and a cover means of material harmless to said sheet covering said spring.

5. Apparatus as in claim 4, further including means to rigidly attach the opposite ends of said spring to said 6. Apparatus as in claim 4, wherein said helical grooves in said stub shafts have the same pitch as that of said spring and a depth approxmately equal to the thickness of the coils of said spring.

7. Apparatus as in claim 4, further including means to adjust the axial position of said other stub shaft to adjust the tension of said flexible spring.

8. Apparatus as in claim 4, wherein said cable is sufficiently thicker than the coils of said spring to provide a major portion of a driving connection between said stub shafts when one of said stub shafts rotates.

9. A conveyor roll for conveying curved sheets comprising a pair of spaced axially aligned stub shafts, a flexible cable extending between said spaced stub shafts, means rigidly connecting one end of said cable to one of said stub shafts, means connecting the other end of said flexible cable to the other of said stub shafts in axially adjustable position relative to said other stub shaft, and a helically wound spring extending from said one stub shaft to said other stub shaft in surrounding relation to said flexible cable, said spring having a portion at each end thereof secured to the adjacent stub shaft.

10. A conveyor roll as set forth in claim 9 having a cover means surrounding said helically wound spring.

11. A conveyor roll as in claim 10, further including means to rigidly attach the opposite ends of said spring to said stub shafts.

12. A conveyor roll as in claim 10, including helical grooves in said stub shafts having the same pitch as that of said spring and a depth approximately equal to the thickness of the coils of said spring.

13. A conveyor roll as in claim 10,, further including means to adjust the axial position of said other stub shaft to adjust the tension of said flexible spring.

14. A conveyor roll as in claim 10, wherein said cable is sufficiently thicker than the coils of said spring to provide a major portion of a driving connection between said stub shafts when one of said stub shafts rotates.

* * * * *

UNITED STATES PATENT OFFICE
CERTIFICATE OF CORRECTION

PATENT NO. : 3,934,996
DATED : January 27, 1976
INVENTOR(S) : Robert G. Frank

It is certified that error appears in the above-identified patent and that said Letters Patent are hereby corrected as shown below:

Column 4, line 42, after "285,998", please insert --of--.

Column 6, line 5, after "produced", please insert --.--.

Column 9, line 15, "34" should be --24--.

Column 12, line 64, "haivng" should be --having--.

Column 14, line 13, ",," should be --,--.

Signed and Sealed this eleventh Day of May 1976

[SEAL]

Attest:

RUTH C. MASON
Attesting Officer

C. MARSHALL DANN
Commissioner of Patents and Trademarks